United States Patent
Fitzgerald

(10) Patent No.: US 6,564,056 B1
(45) Date of Patent: May 13, 2003

(54) INTELLIGENT DEVICE CONTROLLER

(75) Inventor: Christopher A. Fitzgerald, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/368,099

(22) Filed: Aug. 3, 1999

(51) Int. Cl.[7] ............................................... H04Q 7/20

(52) U.S. Cl. ..................... 455/435; 455/420; 455/558; 345/5.1; 345/5.23; 345/5.65; 345/5.8

(58) Field of Search .................................. 455/432, 435, 455/560, 561, 557, 41, 420, 426, 558, 344; 709/249, 220, 221, 222; 710/13; 370/338, 401, 407; 340/5.1, 5.23, 5.25, 5.27, 5.61, 5.64–5.67, 5.8

(56) References Cited

U.S. PATENT DOCUMENTS

| | | | |
|---|---|---|---|
| 4,763,317 A | | 8/1988 | Lehman et al. ................ 370/58 |
| 5,576,972 A | | 11/1996 | Harrison ...................... 364/516 |
| 5,699,357 A | | 12/1997 | Carvey ........................ 370/347 |
| 5,802,467 A | * | 9/1998 | Salazar et al. .............. 455/420 |
| 5,890,064 A | * | 3/1999 | Widergen et al. ........... 455/426 |
| 6,047,071 A | * | 4/2000 | Shah ........................... 380/247 |
| 6,052,750 A | * | 4/2000 | Lea ................................. 707/1 |
| 6,098,116 A | * | 8/2000 | Nixon et al. ................ 709/220 |
| 6,169,725 B1 | * | 1/2001 | Gibbs et al. ................ 348/552 |
| 6,188,873 B1 | * | 2/2001 | Wickman et al. .......... 455/11.1 |
| 6,192,281 B1 | * | 2/2001 | Brown et al. ................. 700/17 |
| 6,288,641 B1 | * | 9/2001 | Casais ......................... 340/505 |
| 6,289,213 B1 | * | 9/2001 | Flint et al. .................. 455/420 |
| 6,327,570 B1 | * | 12/2001 | Stevens ........................ 705/10 |
| 2001/0036835 A1 | * | 11/2001 | Leedom, Jr. ................ 455/509 |
| 2001/0039190 A1 | * | 11/2001 | Bhatnager ................... 455/450 |
| 2001/0041553 A1 | * | 11/2001 | Chang et al. ............... 455/406 |

OTHER PUBLICATIONS

S. Bagchi et al., "OctelNet Protocol Definition", Octel Communications Corporation, Milpitas, CA, (1996), pp 1–5.
Home Wireless Networks (HWN) Internet press release Jan. 1999.
Newsgroup (clari.tw.top) article, ClariNet Electronic Newspaper, "Home Wireless To Link Phones And Computers Without Wires" Jan. 22, 1999.
PR Newswire, "emWare Announces Suppoet for Sun Microsystems' Jini Technology" Java Industry Connection.
The New York Times via DowVision Article, "Philips and Sony Set a Venture With Sun Microsystems" Jan. 19, 1999.
"Jini Technology and Emerging Network Technologies" (2 pages).

(List continued on next page.)

Primary Examiner—Tracy Legree
Assistant Examiner—Miguel D. Green
(74) Attorney, Agent, or Firm—David Volejnicek

(57) ABSTRACT

An intelligent device controller (hub 100) for communications-enabled ("intelligent") devices (120–140) implements a private network (102) of the devices, facilitating communications to and from only those devices that have been registered with the controller. Each device comes with a memory card (220) that stores interface programs for and information-including a unique device ID-about the device. A card reader (202) of the controller reads the memory card to register the device. Communications between the controller and the device are encrypted using the device ID as the encryption key. The private network is either based on standard building wiring or preferably is wireless to enable deployment and relocation of devices easily and,without need for a special infrastructure. The controller has at least one network port (204–208) to connect to an external network (104–108), thereby enabling a user on the external network to communicate with the controller and with the devices as well as enabling the devices to communicate with external service providers.

22 Claims, 9 Drawing Sheets

OTHER PUBLICATIONS

Jini Architectural Overview Technical White Paper, Sun Microsystems, Jan. 1999.

"Plugged into a New Millennium" InfoWorld, pp. 74, 78, 80, 84, 86, 88, Oct. 26, 1998.

"A Wireless Entanglement" Bill Machrone, PC Magazine, Mar. 9, 1999.

Ericcson Internet press release Feb. 18, 1999.

Open Service Gateway Initiative (OSGI) Internet homepage and Frequently Asked Questions (total 5 pages) printed Apr. 27, 1999.

"The Bright Future of Home & Small Office e–Services, Open Service Gateway Specification Consortium White Paper" Open Service Gateway Initiative (OSGI) Internet In The News (total 6 pages) printed Apr. 27, 1999.

* cited by examiner

300

INTELLIGENT DEVICE CONTROLLER

TECHNICAL FIELD

This invention relates to data networking in general and to the networking of dissimilar electronic devices in the home or office in particular.

BACKGROUND OF THE INVENTION

As the demand for consumer- and business-related electronic and electronically-controlled devices surges, the challenge is to bring those individual, self-contained devices together into dynamic, transparent, and simply-connected networks to offer more services and resources to the end-users. The value of such devices to the users substantially increases when they can interconnect and interoperate with each other and with the outside world.

Several technology development efforts are under-way to answer this need for more interconnectivity and an easier way to build, manage, and use the services of digital networking. Many are based on the JINI technology of Sun Microsystems, Inc. Built on Sun's Java technology, JINI is designed to enable users to simply connect to and to access services provided by any number of digital devices such as personal digital assistants (PDAs), televisions, digital cameras, fax machines, cell phones, smart card readers, etc. The goal is to turn the network into a flexible and easily—administered tool on which resources can be found by human and computational clients. The model that is presented by JINI and other technologies as the paradigm for the intelligent device network is the "impromptu" office, where devices self-register and advertise their services. Users plug-in from anywhere to gain access to publicly-available devices and the services they offer.

While this model may be useful for a network printer or public files on a shared disk, the fact is that most intelligent devices are personal and are not intended to be publicly available. The paradigm therefore must shift to focus on treating intelligent devices as private yet mobile.

SUMMARY OF THE INVENTION

This invention is directed to solving these and other problems and disadvantages of the prior art. Generally according to the invention, there is provided a controller for communications-enabled ("intelligent") devices that implements a private network of the devices, facilitating secure communications to and from those devices that have been registered with the controller. Preferably, the security scheme is simple, so that the devices do not need to implement a security scheme that includes special hardware or sophisticated software. Also preferably, the private network carries communications over standard building wiring (e.g., power distribution wiring), or even more preferably is a wireless network, so that the devices can be deployed in a home or an office without need of special wiring or provisioning. Further preferably, the controller connects to an external network (e.g., the Internet or another data network, the telephone network, and/or a cellular network) to enable a user on the external network to communicate with the controller and with devices in the private network, as well as to enable the devices to communicate with external service providers. Illustratively, the Internet, data network, and/or telephone network connections are brought to the controller via a LAN connection and a standard RJ45 LAN connector. Also illustratively, a cellular network connection is an option which can be purchased for the unit. The cellular network connection supports a PPP connection and enables the unit to be called (or to dial out) via the exiting wireless network.

Specifically according to the invention, a controller for communications-enabled devices comprises an input and output port for communicating with a plurality of different communications-enabled devices that communicatively (and preferably wirelessly) connect to the controller, a device registration port (preferably a memory card reader) for receiving registration information for each of the devices, a memory for storing programs and the received device registration information, a processor for executing the stored programs and using the stored information, and a first stored program that causes the controller to communicate with each of the devices via communications that are encoded in a manner that is function of that device's registration information (preferably encrypted using the device's identifier as the encryption key). The controller further preferably includes at least one second input and output port for communicating on an external network (e.g., a data network such as the Internet) that communicatively couples to the controller, and a stored program that causes the controller to communicate through the second port on the external network and to communicatively connect at least some of the devices to the external network.

Controller illustratively provides the following features:

Personal, private, device networking

Wireless connectivity

Security

Reliability

Support for device mobility

Integrated access and control from a central location

External remote access and control

Shared centralized functionality (e.g., provisioning, external communications, scheduling)

These and other features and advantages of the invention will become apparent from the following description of an illustrative embodiment of the invention considered with the drawing.

DETAILED DESCRIPTION

Figure 1:
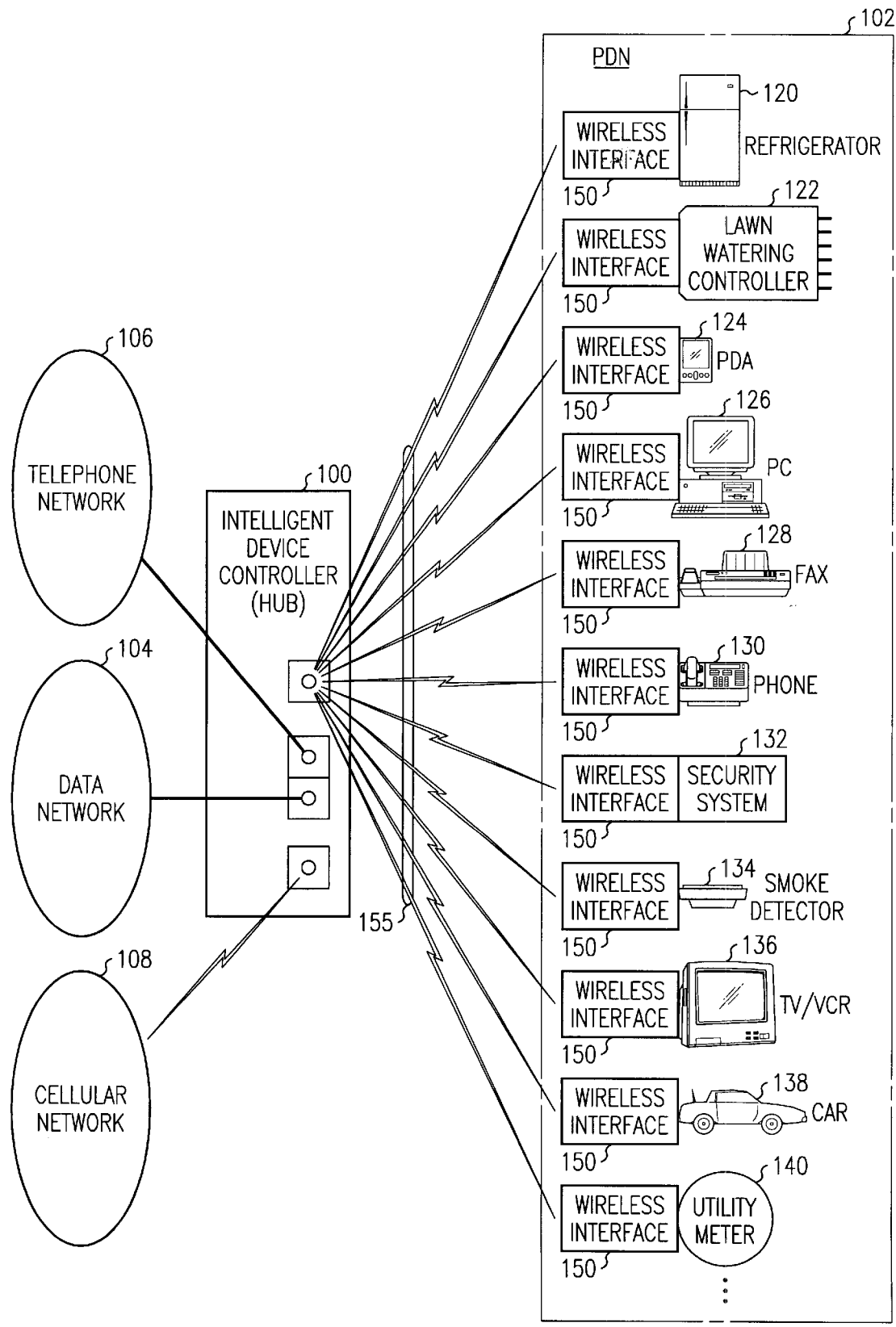
FIG. 1 is a block diagram of a communications network that includes an illustrative embodiment of the invention.

FIG. 1 shows a communications network that includes an illustrative embodiment of the invention. The network is centered on an intelligent device controller, or hub, 100 which interconnects a plurality of dissimilar devices 120–140 into a personal device network (PDN) 102, and interfaces PDN 102 to other networks such as a data network 104 (e.g., a LAN, WAN, or the Internet), a telephone network 106 (either public or private), and/or a cellular radiotelephone network 108.

Devices 120–140 are typically the types of devices that one would find in a home and/or a business. They may include refrigerators and other appliances 120, lawn watering controllers 122, personal digital assistants (PDAs) 124, computers (PCs) 126, fax machines 128, telephones 130, security systems 132 including security cameras, smoke detectors 134, TVs and/or VCRs 136, automobiles 138, and utility meters 140, climate (heating and air conditioning) controls, patient monitors, etc. Stationary devices may be connected to hub 100 by wire links, such as telephone lines or power lines on which communications signals have been superimposed. Providing a wired network for all intelligent devices located in a home, office, hotel, etc. is not very practical, however. Moreover, a wired network is not adequate to serve devices that are mobile, such as PDAs 124 and automobiles 138. Mobile devices need to be connected to hub 100 via wireless links. Moreover, wireless links enable any of the devices to be positioned anywhere without regard to the presence of wired connections and without need to install an expensive physical (wire) connectivity infrastructure. Wireless links 155 are therefore preferred for all devices 120–140. Each device 120–140 is equipped with a wireless interface (WI) 150 that couples the device to the wireless medium and enables it to communicate thereacross. WIs 150 may be either external or built into their corresponding devices. Illustratively, the wireless medium and wireless interfaces 150 are implemented via a home wireless network (HWN) of Home Wireless Networks, Inc.

Some devices, like PDAs 124 and automobiles 138, travel with their users from place to place, e.g., from home to office to hotel, etc., and therefore may travel from one PDN 102 to another if each place has its own PDN 102. A device may therefore belong to different PDNs 102 at different times.

Hub 100 is a device which:

- enables intelligent devices 120–140 to communicate with the outside world
- provides a secure single point of access to intelligent devices 120–140 in the home or business
- provides a user interface to devices 120–140: it is the only machine on which a device's user interface executes.
- provides an interface between intelligent devices 120–140 and various types of service providers
- allows a user to access (query/command) and program his or her intelligent devices 120–140
- provides a mechanism for intelligent devices 120–140 to share data
- can communicate with any wireless devices 120–140 which understand the hub's encryption and decryption scheme. The preferred method of interaction is through the use of data objects and user programs.
- preferably has connectivity to the Internet. While not required, it is useful to get the full benefit (e.g., service provider/Web access to devices). This connectivity is illustratively implemented via cable modem or ADSL. A dialer (in and outbound) may be added as an option.

Hub 100 provides three types of communications interfaces: among devices 120–140, between devices 120–140 and remote service providers (via networks 104–108), and between devices 120–140 and a user. For example, a smoke detector 134 uses all three types of communication interfaces. The device-to-device interface is used when an alarm on one smoke detector 134 causes hub 100 to set off alarms on all smoke detectors 134. The device-to-service provider interface is used when a smoke detector 134 goes off and automatically sends an alarm to the local fire department through hub 100 via network 104 or 108. And the user interface is used when a smoke detector 134 notifies the user of a dying battery by causing e-mail to be sent by hub 100 to the user's registered e-mail account.

Figure 2:
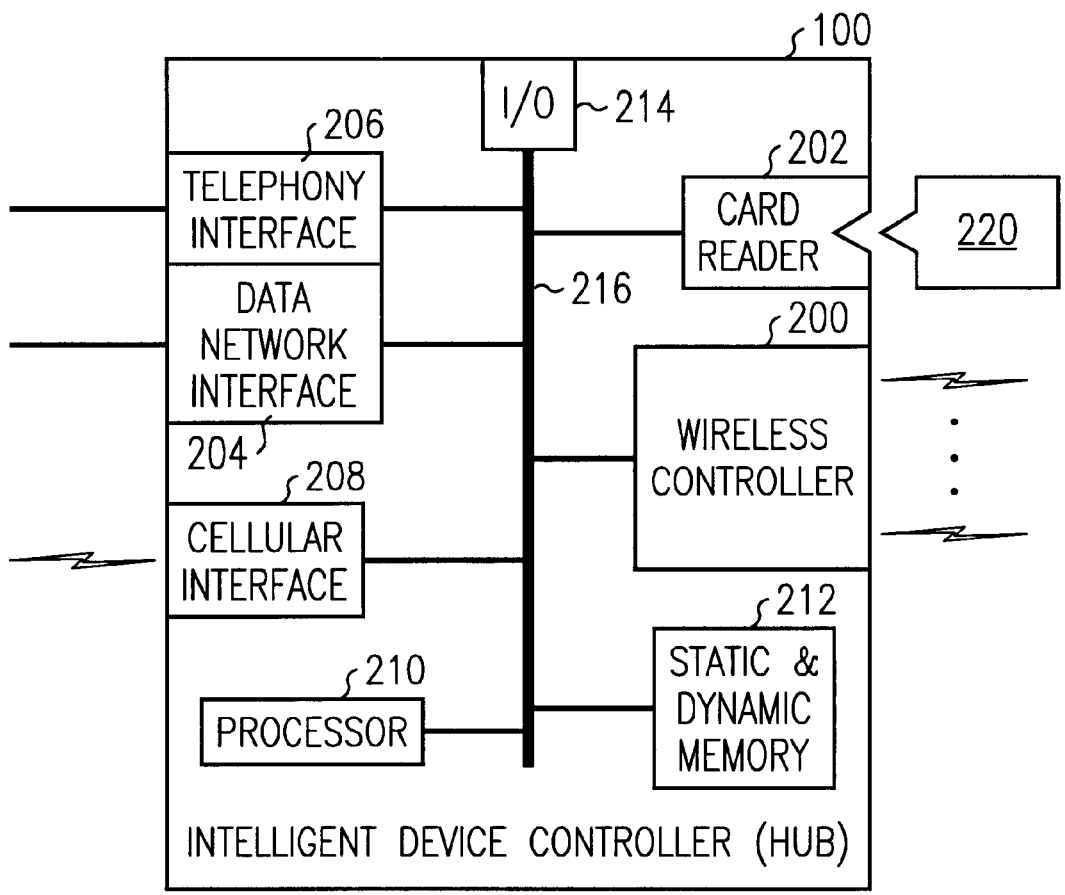
FIG. 2 is a block diagram of an intelligent device controller, or hub, of the network of FIG. 1.

A block diagram of intelligent device controller 100 is shown in FIG. 2. It includes interfaces 204–208 to data network 104, telephone network 106, and cellular network 108, respectively, and a wireless controller 200 for PDN 102. Alternatively, interfaces 204 and 206 to data network 104 and telephone network 106 may be combined into a single interface that connects to a cable, DSL, or other LAN, WAN, or Internet-type of connection. Wireless controller 200 is illustratively the controller of the abovementioned HWN. Hub 100 is a stored-program-controlled machine. It further includes a memory 212 for storing programs and data, and a processor 210 for executing the programs and using the data. The programs include an operating system (O.S.), which may be any desired operating system, such as Java O.S. of Sun Microsystems, Inc., but is preferably the Inferno O.S. of Lucent Technologies Inc. The programs preferably also include a Web server program which allows hub 100 to act as a Web server and be accessed via interface 204 or 208. For on-site communications with a human user, hub 100 may include an input and output (I/O) facility 214, such as a display and a keyboard. Alternatively, PC 126 serves as the user's interface to hub 100, thereby avoiding the cost of I/O facility 214. For ease of administration and programming, hub 100 includes a card reader 202 for reading memory cards 220, such as magnetic-strip cards or smart cards. Its use is discussed below in more detail. Elements 200–214 are interconnected by an internal communications medium 216, such as a processor bus. Elements 200–214 are individually conventional.

Hub 100 is designed as a reliable device. This means that it preferably has no moving parts (no hard drive), has built-in power surge protection, and optionally may have uninterruptible power supply (UPS)-like backup power. Hub 100 has dynamic memory (RAM) for processing and static memory (flash memory) for configuration data storage. With flash memory present, devices 120–140 can be made cheaper, because they do not need special memory or devices to deal with power outages.

As was mentioned above, most intelligent devices 120–140 are personal, yet many can move between PDNs 102. Furthermore, many of the devices 120–140 are dissimilar and each has its own administration needs and ways of communicating and interacting with other entities. To accommodate all three characteristics, hub 100 provides for device registration. Device registration is facilitated by use of a smart card or a magnetic strip card (generically referred to herein as memory card 220; see FIG. 2). When a user buys an intelligent device 120–140, it comes with a memory card 220 that contains data pertaining to the device, including its manufacturer-assigned device ID number, and programs for communicating and interacting with/by that device 120–140. To activate device 120–140 in a particular PDN 102, the user must register the device with that PDN's hub 100. Without registration, hub 100 does not know anything about that device 120–140. To register device 120–140, the user inserts the device's memory card 220 into card reader 202 of hub 100. Reader 202 reads the information into memory 212 of hub 100. This makes hub 100 aware of the device 120–140, and also sets up a unique encryption/decryption mechanism for communications between hub 100 and this device 120–140. Once hub 100 has the device ID number and programs, it tries to contact that device 120–140 and to transfer any requisite information to it. This does not mean that the intelligent device 120–140 cannot receive transmissions from hub 100 without registration. What it means is that none of the received messages can be decoded by the intelligent device 120–140, because none have been encrypted using the device's unique (device ID-based) encryption/decryption mechanism. Except for special cases (e.g., phones, mentioned below), only one device 120–140 can decode a message which has been sent from a hub 100.

Security between hub 100 and intelligent devices 120–140 is done via standard Internet private and public key encryption/decryption mechanisms, e.g., RSA. The private key is based on the unique device ID of a device 120–140. The device ID, stored on the memory card 220, is known only to hub 100, to that intelligent device 120–140, and to any service provider that needs to communicate with this device 120–140. Hub 100 encrypts data for a device 120–140 with the private key. Devices 120–140 therefore must be able to perform decryption based on a stored private key. If device 120–140 cannot decrypt a message, it can safely throw it away, since it belongs to another device 120–140. The security scheme ensures that only messages intended for a specific device 120–140 will be able to be decoded by that device 120–140. Data can be downloaded to and collected from an intelligent device 120–140. Correspondingly, upon receiving a message, hub 100 must make somewhere between 1 and n (where n is the number of devices registered with hub 100) attempts at decrypting a message. If hub 100 cannot decrypt the message, it too can throw it away.

Some devices 120–140 will need to operate in conjunction with other devices 120–140. An example is a set of phones 130 in the home. Phones 130 each have a different device ID number, but software on hub 100 optionally creates a link between phones 130 so that an incoming call simultaneously alerts on all of them. An alternative solution involves changing the device ID number on all phones 130 to the same number. This allows any phone 130 with the device ID number to both encrypt and decrypt a call simultaneously. There may be other classes of devices where this would be useful.

An intelligent device 120–140 can be registered with more than one hub 100. All that is required is to insert the device's memory card 220 into hub 100 of whichever PDN 102 one wants to register that device 120–140 in. This is beneficial with something like a car 138, where one has car 138 registered at home but may also have it registered at work or at a mechanic's garage. In cases where multiple hubs 100 are encountered, the owner of a device 120–140 will probably want to attach security to device 120–140 to protect against misuse. This means that an intelligent device 120–140 needs to be able to operate in a secure mode (e.g., requires a password). Thus, one of the static pieces of data which a device 120–140 must keep internally is its own security password. The presence of this password requires that all decrypted data contain (in a special location in the protocol) the security password for the device. When activated, an intelligent 120–140 device continually checks for the presence of this password in all incoming messages. The password is required primarily when device 120–140 is interacting with a hub 100 which is not its "home" or primary hub.

An intelligent device 120–140 can have multiple levels of security. An example of these security levels can be seen with a car 138. In a car 138, there will be numerous interactions available. These will include the car's running state, digitally-stored music selection, radio presets, security, etc. There may be a password for setting the security system which is different from the security password for changing enginerelated computer settings. The security password for the security system is known to the owner only, while the engine password might be known to the garage where car 138 is serviced. Hub 100 provides a point of presence on the Web for car 138. This allows a mechanic to quickly check a car 138 when that car 138 is at the user's home or workplace (provided that the employer has a hub 100 and car 138 is also registered thereon).

Hubs 100 and intelligent devices 120–140 communicate data in the form of data objects. Data objects are a means for intelligent devices 120–140 to deliver data or information to hub 100 and in some cases beyond (e.g., to service providers, e-mail, etc.). Conversely, hub 100 can deliver data objects to intelligent devices 120–140 that are known to it, for purposes of provisioning, query, command, and general data transfer. General data can be voice, video, audio, etc. Devices 120–140 preferably support industry standard data object formats. Examples of these include programming for radio stations, VCR programming, phone speed dial, etc. The use of common data objects enables devices 120–140 to share data and allows service providers to accurately read data from intelligent devices 120–140 which are forwarding alarms or diagnostic information.

Data objects may be registered nationally (globally), and any data object received from a device 120–140 or sent to a device 120–140 must carry registration information. The registration may be manufacturer-specific or universally-recognized. If the registration is a universally-recognized one, it opens the possibility for sharing of data objects among devices 120–140. This means that a device 120–140 like a clock radio which has a data block for radio presets can accept that data block form some other device 120–140 which has the same registered data block. This allows a user's car 138, stereo, clock radio, etc., to all use the same presets. This functionality can be automated or used in a drag-and-drop fashion via a Web page of hub 100 (more on this later).

Data objects communicated from a device 120–140 to hub 100 are of two types: data blocks and programs. Data blocks are objects which can be anything from data concerning the state of the device, to queries, to alarms. Some devices 120–140 have as their primary purpose the task of monitoring and generating an alarm when conditions warrant. The most obvious example of this is smoke detector 134. Intelligent smoke detector 134 will automatically alert a fire department when detector 134 is triggered. Smoke detector 134 may allow the user some amount of programmability. An example of this would be to insert a delay between the time the alarm sounds and the time the fire department is called. This would be useful in those instances where detector 134 has been tripped due to a smoky kitchen and the user needs a little time to fan the smoke. Hub 100 has a vacation feature that disables this delay.

Some devices support multiple alarms. One example of this is car 138. It may generate an alarm if it is stolen or damaged, and it may generate another alarm when something goes wrong mechanically. The programs offered with car 138 let the user forward an alarm to the correct service provider. In addition, the owner may want to send a single alarm to multiple locations and/or with different types of urgency (e-mail, direct alert, etc.)

Alarms can have service provider registrations which dictate one or more actions when they are received. The action mappings for intelligent device alarms are provisioned and stored on hub 100. Examples of action mappings for alarms are sending out e-mails or alerts. Alarms are intended to be sent to service providers who are equipped to receive them.

Programs which can be uploaded from a device 120–140 (or from the device's memory card 220) provide a user interface and a data query capability. The programs provided with a device 120–140 allow a user to work with various aspects of device 120–140. For example, a car's programs allow the user to program the radio, provision a garage where diagnostics can be e-mailed and interpreted, identify a security service provider, or download music.

Data query is the ability to collect information from hub 100 through a standard data object provided via the device's programs.

Data communicated from hub 100 to intelligent devices includes: program downloading, data query, parameter setting, commands (to be executed), and streaming data.

Intelligent device programs may come pre-installed in a device 120–140. If a memory card 220 that is delivered with a device 120–140 contains the required programs instead, hub 100 needs to upload those programs to the device 120–140 once communication is established. This may be a preferred mode of operation in that it makes devices 120–140 cheaper if they do not have to store their programs (cars excepted). When device 120–140 is powered up, hub 100 establishes communications with device 120–140 and downloads its programming. This includes the programs and data used to configure device 120–140 (e.g. radio station programming). The programs are subsequently maintained via the Internet and the device manufacturer's Web site.

Data query is the ability to collect state information from a device 120–140 through a standard data object provided via the device's programs. A device 120–140 should be able to be queried on demand to provide information about its current state. An example is a thermostat, which not only can receive commands but can deliver data on the present temperature of its surroundings. The types of queries which a device 120–140 supports are dictated by the software provided with the device. Uploading new software to an existing device is therefore enabled.

Parameter setting is the function where a user can automatically or manually upload control settings to a device 120–140. This could be radio settings, thermostat settings, etc.

Command execution enables certain devices 120–140 to perform tasks at periodic intervals. These devices 120–140 receive commands from hub 100 with details about an activity they are to perform. An example here is a home watering system. Hub 100 can tell the zone controller of the watering system when it is time to water, which zones to water, and for how long. These commands may come from an outside service provider who takes into account present weather conditions, the last time that watering was done, and user preferences.

Streaming data is data that flows continuously (or for an extended period) between hub 100 and a device 120–140. This type of data is characterized as either continuous or bulk. An example of continuous data is a phone conversation. Bulk data is something like the uploading of music to one's automobile (this may require a Web browser with cut-and-paste/drag-and-drop capability; this is essentially dropping an URL on a target). That is, large amounts of data being transferred in a single direction.

As mentioned previously, an intelligent device 120–140 has a set of programs and data objects which drive it. There are two types of programs for a device 120–140. One runs on intelligent device 120–140 and controls its operation and interaction with hub 100. These intelligent device programs control actions such as alarm and state data object creation and their transfer to hub 100. Another function of these programs is to receive data objects from hub 100. These objects may provide things like clock time, and/or initial device settings.

The second type of program resides on hub 100. These programs are meant for user interaction with device 120–140. This includes data query and configuration (or provisioning). There are two ways for a user to gain access to these configuration programs. The first is to directly address hub 100 over a LAN or WAN. Once hub 100 is addressed, its Web home page displays all device types registered on that hub 100 and provides a starting point for accessing a specific device's programs. The fact that hub 100 is addressable via a LAN or the Internet means that it must also act as a Web server in that it has to support queries. The second way to access hub 100 is from PC 126. PC 126 is equipped with a circuit card (itself an intelligent device) allowing direct addressing of hub 100 in the same manner as via a LAN or the Internet.

There are circumstances under which data objects need to be passed from one device 120–140 to another. These data objects are in the form of commands or parameter settings. The command type of data exchange may, for example, trigger all fire alarms when one goes off (again after an initial delay period). The parameter exchange allows information like radio station settings to be copied from one radio to another.

If a device 120–140 suffers a power failure, it is automatically re-initialized by hub 100 when it recovers. If device 120–140 is a clock radio, the procedure might be as follows: Re-establish device identity of the intelligent device by sending an initial message requiring nothing more than an acknowledgement. This message also re-establishes the security password for this device if needed. Data encryption/decryption is automatic since it is based on the intelligent device's manufacturer-assigned device ID (contained on memory card 220). Next, hub 100 uploads the present time, radio presets, and last-set wake-up times. It also enables the wakeup alarm if it was on before the power outage. All of this activity is controlled by the manufacturer-supplied reset program which is executed by hub 100 as part of the device power on/reset capability. The reset program may initiate data object transfer only. In essence, it may request that hub 100 transfer various data objects to the intelligent device in question. The supplied program may not initiate actions on its own but only through a documented application program interface (API).

As with any LAN, an intelligent device 120–140 first has to "seize" the attention of hub 100. before it can transmit any data. This is done with an access-seizure data object. This object identifies device 120–140 that wishes to transmit. If hub 100 can, it replies to intelligent device 120–140 that is requesting access and allows it to transmit. Of course, all previously-mentioned data object formats and encryption/decryption requirements are used in this wireless seizure handshake.

Of benefit to manufacturers may be automated product registration (a user will want to be able to turn this and other functions off) and tracking of products even if re-sold (e.g., a car). In addition, a manufacturer could be one of the destinations for alarm objects which give detail about some problem with the device.

The intelligent device controller (hub 100) implements the above-described capabilities via control programs stored in its memory 212, whose functionality is flow-charted in FIGS. 3–9.

Figure 3:
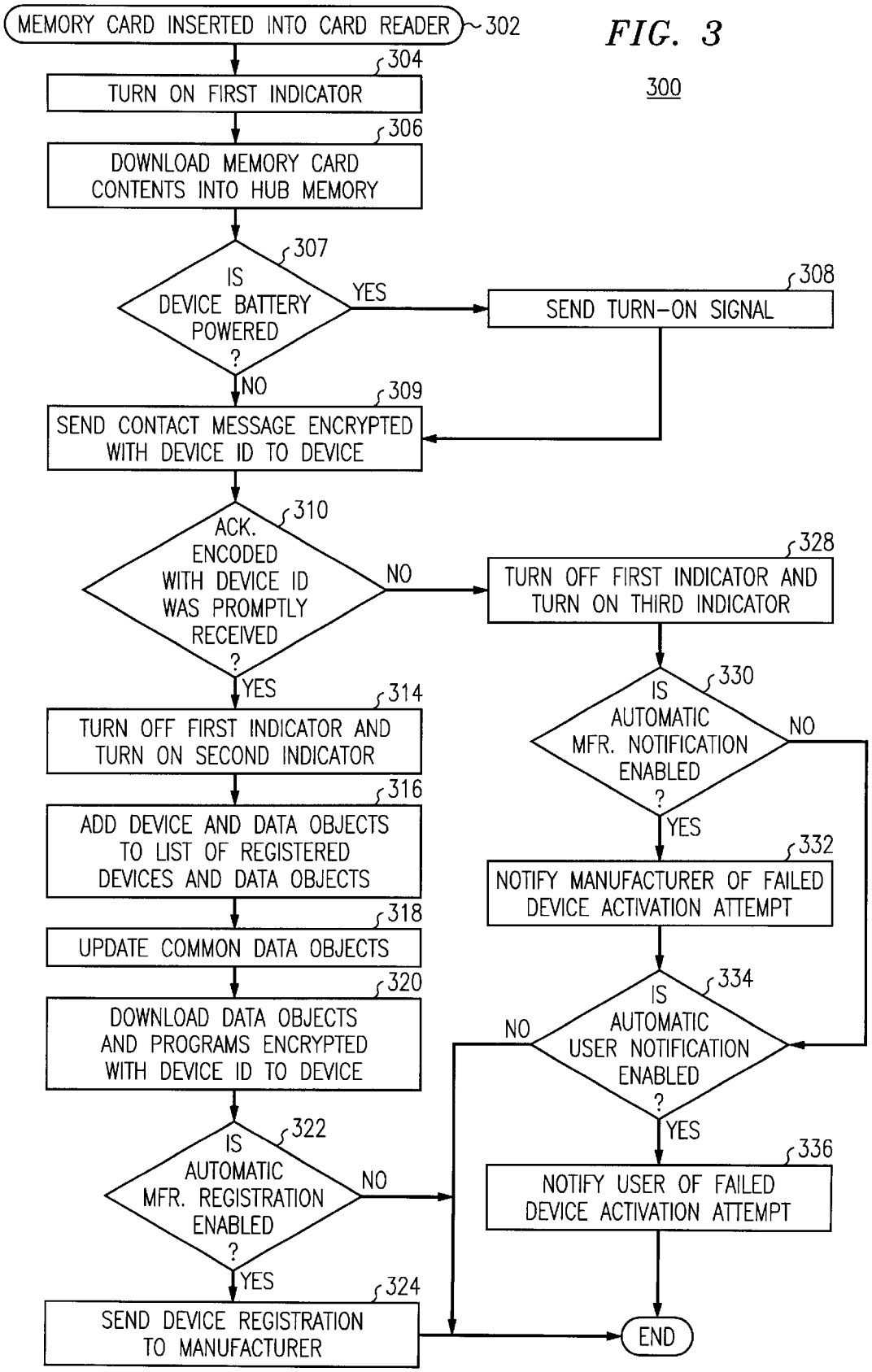
FIG. 3 is functional flow diagram of a device registration program of the hub of FIG. 2.

FIG. 3 shows a device 120–140 registration program 300. When a user inserts a memory card 220 of the device 120–140 into card reader 202, at step 302, program 300 turns on a first indicator of card reader 202 (e.g., a red and a green light emitting diode, or LED, which are alternatively flashed on and off) to acknowledge to the user that it is processing memory card 220, at step 304, and downloads the device ID, data objects, common (shared) data object identifiers, user interface programs, and other information from memory card 220 into memory 212 of hub 100, at step 306. Program 300 examines the downloaded information to determine therefrom if device 120–140 is battery-powered, at step 307. If device 120–140 is battery-powered, it has a wireless interface 150 that is normally in standby mode (turned off) to conserve power. To turn wireless interface 150 on, program 300 causes wireless controller 200 to transmit a turn-on signal, at step 308. Illustratively, this is a generic signal that causes wireless interfaces 150 of all battery-powered devices 120–140 to turn on and start listening for incoming messages directed to them. If a wireless interface 150 does not receive a message for its device 120–140 within a predetermined interval of time, it returns to its standby mode (turns off again). Following step 308, or if device 120–140 is not battery powered, program 300 causes wireless controller 200 to send a contact message to device 120–140 which message is encoded using the downloaded device ID as the encryption key, at step 309, and waits a predetermined amount of time for device 120–140 to respond with an acknowledgement message that is encoded using the device ID as the encryption key, at step 310. If the awaited acknowledgement is received in a timely manner, as determined at step 310, program 203 turns off the first indicator and turns on a second indicator of card reader 202 (e.g., the green LED) to signal successful device registration to the user, at step 314, and adds device 120–140 to a list of devices that are registered with hub 100, at step 316. Program 300 then updates any common data objects that are identified for this device (e.g., present time), at step 318, and encrypts and downloads those common data objects as well as data objects and interface programs received for this device to device 120–140 via wireless controller 200, at step 320. Program 300 also checks stored information for whether hub 100 has automatic manufacturer registration enabled, at step 320, and if so, uses information received via the device's memory card 220 to automatically contact the device's manufacturer via a network 104–106 and register device 120–140 with the manufacturer, at step 324.

Returning to step 312, if the awaited acknowledgement is not received from device 120–140 in a timely manner, program 300 turns off the first indicator and turns on a third indicator of card reader 202 (e.g., the red LED), at step 328, and then checks stored information for whether hub 100 has automatic activation-failure notification of the device's manufacturer and/or user enabled, at steps 330 and 334, respectively. If it determines at step 330,that manufacturer notification is enabled, it uses information received via the device's memory card 220 to automatically contact the device's manufacturer via a network 104–106 and notify the manufacturer of the device activation failure, at step 332. If it determines at step 334 that user notification is enabled, it uses stored information to send e-mail notification of the device activation-failure to the user, at step 336. In the meantime, the first indicator (e.g., the red LED) remains on until memory card 320 is removed from card reader 200 to signal that registration of device 120–140 was not successfully completed.

Figure 4:
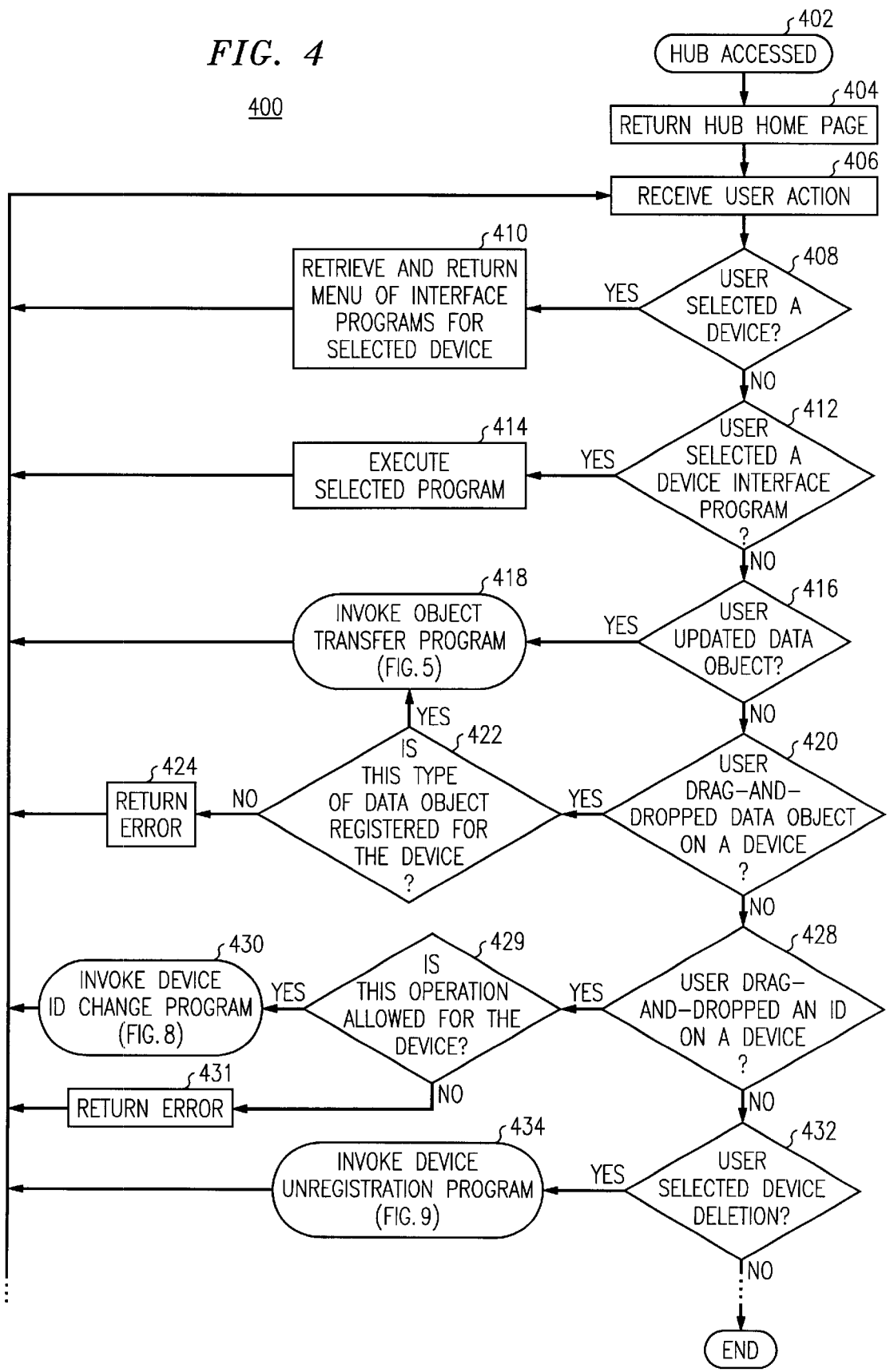
FIG. 4 is a functional flow diagram of a user interface program of the hub of FIG. 2.

FIG. 4 shows a user interface program 400. As was stated previously, hub 100 functions as a Web server. A user accesses hub 100 via data network 104, at step 402. This involves the user successfully logging in and providing the correct password. In response, program 400 returns a home page of hub 100 that includes a menu of all devices in PDN 102 and of their data objects that are registered with hub 100, at step 404. When the user performs an action on the received page (e.g., a pointer device click or drag-and-drop operation), hub 100 receives notification thereof, at step 406, and determines what action had been taken, at steps 408–420.

If the user selects ("opens") a device from the home page menu, as determined at step 408, program 400 retrieves from memory 212 and returns to the user a menu of user interface programs for the selected device, at step 410. If the user selects one of the programs from this menu, as determined at step 412, program 400 causes hub 100 to execute the selected program, at step 414. If as a part of the program's execution the user updates a data object, as determined at step 416, program 400 invokes an object transfer program, at step 426. If the user drags-and-drops an object on a device in the home page menu, as determined at step 418, program 400 checks whether this type of object is recognized by (registered for) this device, at step 422. If not, it returns an error, at step 424; if so, it invokes the data object transfer program, at step 426. If the user links an ID to a device (e.g., drag-and-drops an ID on a device) in the home page menu, as determined at step 428, program 400 checks the device's registration data for whether an ID change is allowed for this device, at step 429. If not, it returns an error, at step 431; if so, it invokes a device ID change program of FIG. 8, at step 430. If the user selects to delete a device from the home page menu, as determined at step 420, program 400 invokes a device unregistration program of FIG. 9, at step 434.

Figure 5:
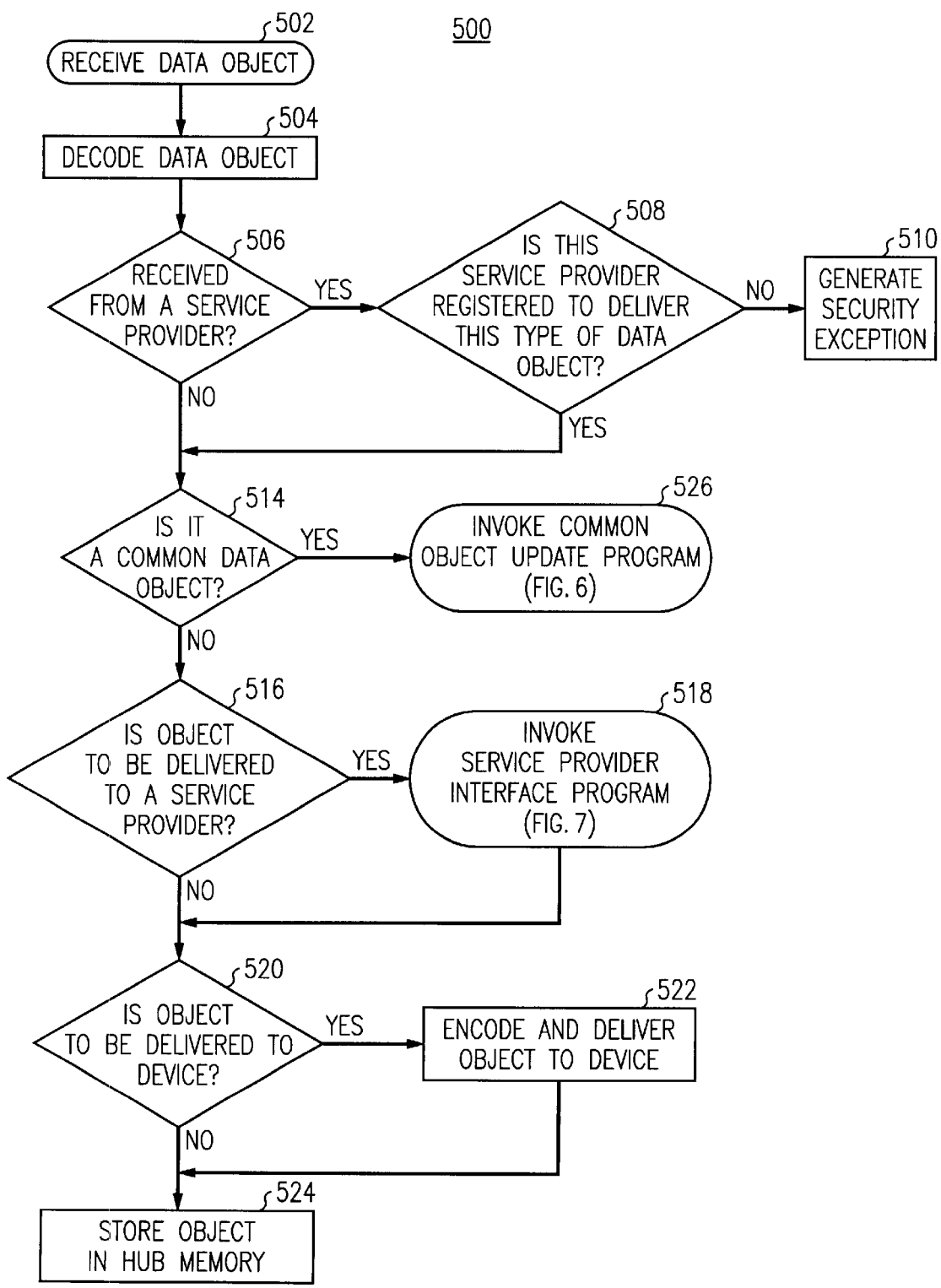
FIG. 5 is a functional flow diagram of an object transfer program of the hub of FIG. 2.

FIG. 5 shows an object transfer program 500. Hub 100 may receive a data object (new or updated) in one of three ways: from an interaction with the user (e.g., step 418 of FIG. 4), from a service provider (via one of the networks 104–108), or from a device 120–140 (e.g., a triggered fire alarm). Upon receipt of the data object, program 500 is invoked, at step 502. Program 500 first decodes the received object, if it is received in encoded form, at step 504. If the object is received from a device 120–140, program 500 uses the sending device ID as the decryption key. If the object is received from a network 104–108, program 500 uses as the decryption key either the ID of hub 100 or a key that is registered with hub 100 for the entity that sent the object. Program 500 then checks if the object was sent by a service provider, at step 506, and if so, whether this service provider is registered with hub 100 to deliver this type of data object, at step 508. If the service provider is not registered to deliver this type of data object, program 500 generates a security exception, at step 510. If the service provider is registered, or if the source of the object is not a service provider, program 500 checks stored information for whether the object is a common data object, that is, whether it is registered to a plurality of devices, at step 514. If so, it invokes a common object update program of FIG. 6, at step 526. If it is not a common object, program 500 checks stored information for the corresponding device for whether this data object is to be delivered to a service provider, at step 516. If so, it invokes a service provider interface program of FIG. 7, at step 518. Following step 518, or if it is determined at step 506 that the data object is not to be delivered to a service provider, program 500 checks stored information for the corresponding device for whether this data object is to be delivered to the device, at step 520. If so, it encodes the data object with the device's ID and causes wireless controller to transmit it to the device, at step 520. Following step 522, or if it is determined at step 520 that the data object is not to be delivered to the device, program 500 stores the object in memory 212 of hub 100, at step 524.

Figure 6:
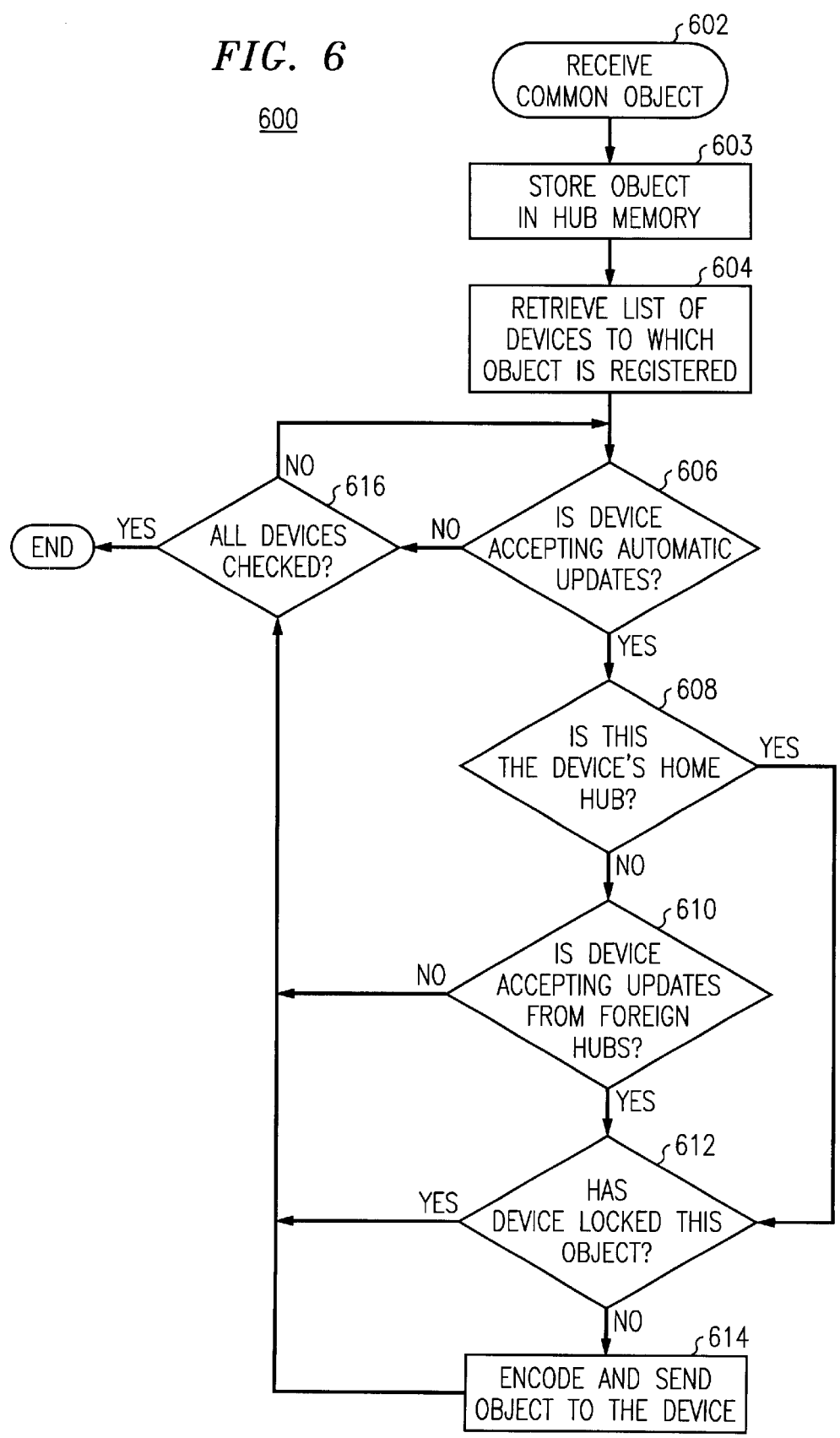
FIG. 6 is a functional flow diagram of a common object update program of the hub of FIG. 2.

FIG. 6 shows a common object update program 600, which is invoked at step 516 of FIG. 5 upon receipt of a new or updated object that may be common to a plurality of devices 120–140. Upon its invocation, at step 602, program 600 stores the object in memory 112 of hub 100, at step 603. Program 600 then retrieves from memory 212 a list of all devices 120–140 that are registered as using this object, at step 604. For each of those devices 120–140, program 600 checks stored information to determine if the device is accepting automatic updates of this common object, at step 606. If not, program 600 returns to check another device, at step 616; if so, program 600 checks if this hub 100 is designated in the stored information as a home hub for this device, at step 608. If this is not the home hub, as determined at step 608, program 600 checks if the device is accepting updates from foreign hubs, at step 510. If not, program 600 returns to check another device, at step 616. If so, or if this is the home hub, program 600 checks if the device has locked this object (i.e., is not presently accepting automatic updates of this object), at step 612. If so, program 600 returns to check another device, at step 616; if not, program 600 encodes the object and causes controller 200 to send it to the device, at step 614.

Figure 7:
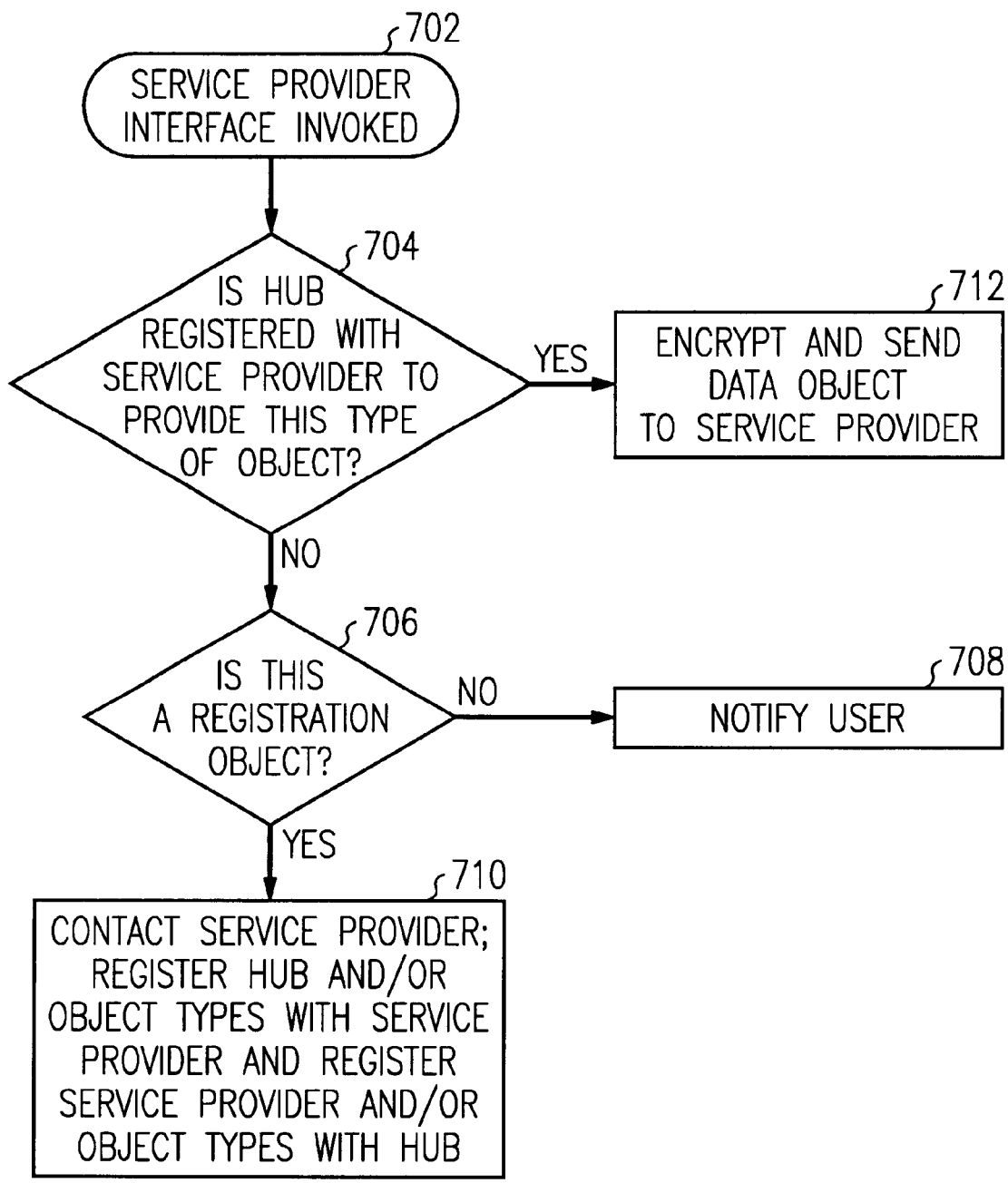
FIG. 7 is a functional flow diagram of a service provider interface program of the hub of FIG. 2.

FIG. 7 shows a service provider interface program 700, which is invoked at step 518 of FIG. 5 when a data object is to be delivered to a service provider. Upon its invocation, at step 702, program 700 checks information stored in memory 212 to determine whether hub 100 is already registered with this service provider for this object type, at step 704. If hub 100 is not properly registered, program 700 determines if this is a registration data object, at step 706. If not, program 700 notifies the user, e.g., by sending e-mail, at step 708. If it is a registration object, program 700 uses stored information to contact the service provider via one of the networks 104–108 and interacts with the service provider to automatically register hub 100 and/or object types with the security provider and also to register the security provider and object types therefor with hub 100, at step 710. These communications are preferably encrypted.

Returning to step 704, if it is determined that hub 100 is properly registered with this service provider, program 700 encrypts the data object by using the ID of hub 100 as the encryption key, and sends the encrypted data object to the service provider via one of the networks 104–108, at step 712.

Figure 8:
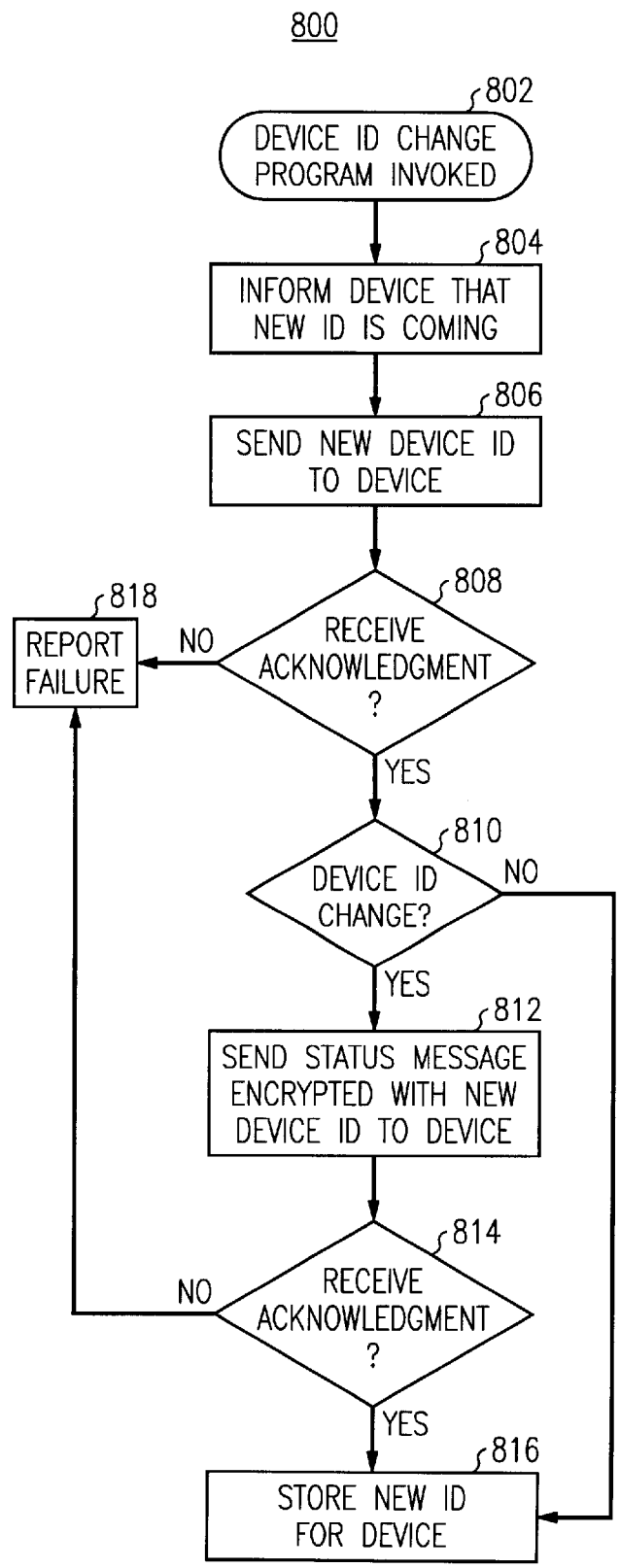
FIG. 8 is a functional flow diagram of a device ID change program of the hub of FIG. 2.

FIG. 8 shows a device ID change program 800, which is invoked at step 430 of FIG. 4 when a new ID is to be assigned to a device 120–140. Upon its invocation, at step 802, program 800 sends a message to device 120–140 informing it that a new ID is coming, at step 804. This allows device 120–140 to place itself in a proper state for changing an ID. Program 800 then sends the ID to the device, along with information regarding the type of ID it is (e.g., a device ID that is used as an encryption/decryption key, or an address ID such as a telephone number) and whether this ID is to supplement or to replace the existing ID or IDs, at step 806. If device 120–140 fails to return a prompt and proper acknowledgement of the ID, as determined at step 808, program 800 reports a failure to implement the new ID to the user, e.g., by sending e-mail to PC 126, at step 818. If device 120–140 does return a prompt and proper acknowledgement, program 800 checks whether the new ID is a device ID or some other ID, at step 810. If it is not a device ID, program 800 merely stores the ID for the device in memory 212, at step 816. If it is a device ID, program 800 tests it out by encrypting a status message with this new device ID and sending it to device 120–140, at step 814. If device 120–140 does not return a properly-encrypted and timely acknowledgement, as determined at step 814, program 800 reports a failure to implement the new ID to the user. If device 120–140 does return a prompt and proper acknowledgement, program 800 stores the ID for device 120–140 in memory 212, at step 816.

Figure 9:
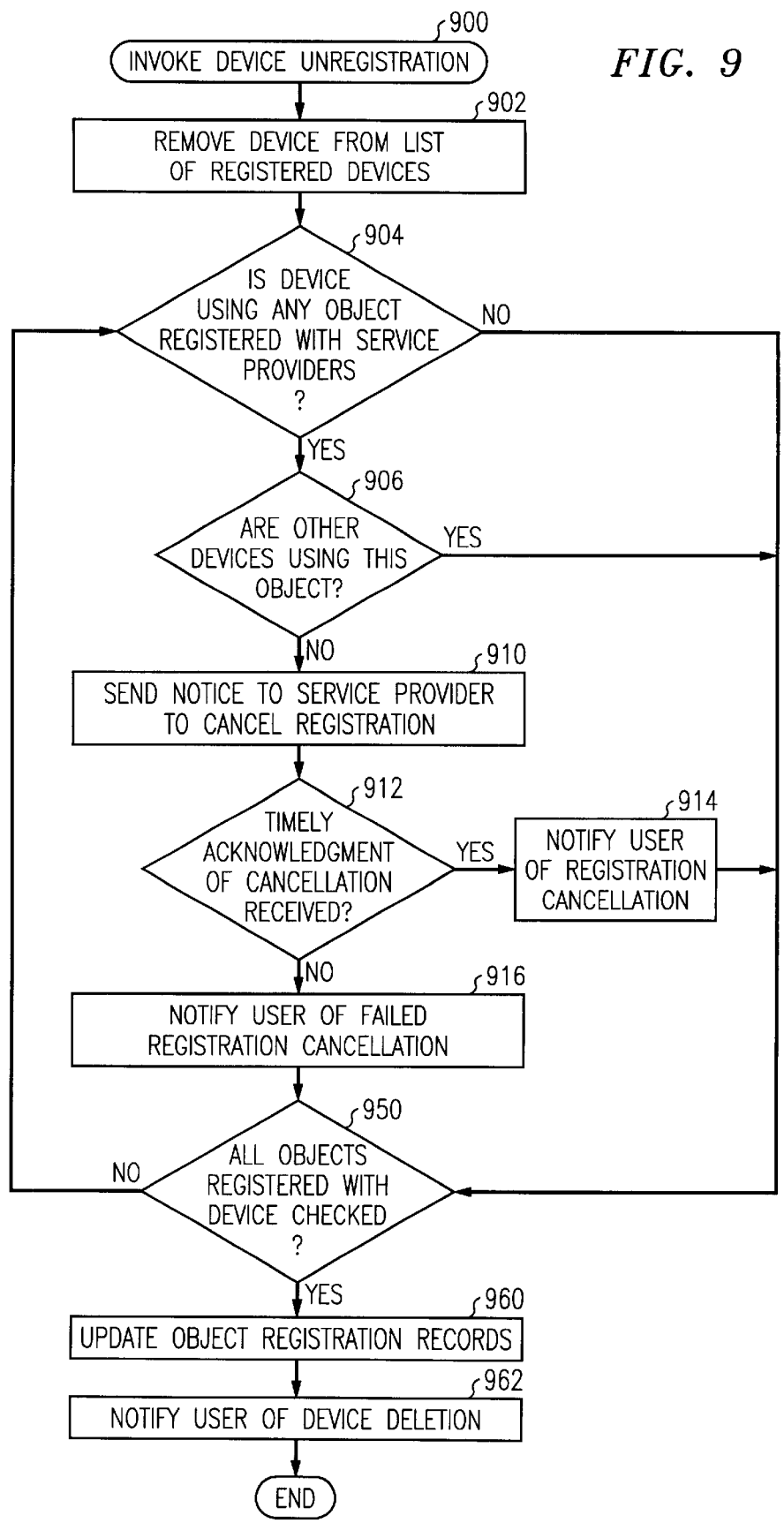
FIG. 9 is a functional flow diagram of a device unregistration program of the hub of FIG. 2.

FIG. 9 shows a device 120–140 unregistration program 900, which is invoked at step 434 of FIG. 4 upon a user electing from the home page of hub 100 to delete that device 120–140 from PDN 102. Upon its invocation, at step 902, program 900 removes the subject device 120–140 from a list of devices 120–140 that are registered with hub 100, at step 904. Program 900 then checks a list of data objects that are registered for this device 120–140 to determine if any of them are also registered with a service provider, at step 906. If a data object is not registered with a service provider, program 900 proceeds to check if all of the device's registered data objects have been checked, at step 950, and if not, returns to step 904. If a data object of the device is also registered with a service provider, program 900 checks registration records for whether there are other devices 120–140 for which this object is also registered, i.e., if it is a common object, at step 906. If so, program 900 proceeds to steps 950 et seq. If the object is not a common object, program 900 sends a notice to the object's corresponding service provider to cancel the registration of the object with the service provider, at step 910, and awaits a prompt acknowledgement from the service provider, at step 912. If it receives a prompt acknowledgement at step 912, program 900 notifies the user that the device's registration with the service provider has been canceled, at step 914. If it does not receive a prompt acknowledgement at step 912, program 900 notifies the user of a failure to cancel the device's registration with the service provider, at step 916. Following steps 914 and 916, program 900 proceeds to steps 950 et seq.

When program 900 determines at step 950 that all objects registered for the subject device 120–140 have been checked, it updates data object registration records, at step 960, to delete objects that are registered with only this device 120–140 and to delete this device 120–140 from registration records of any common objects. Program 900 then notifies the user that device 120–140 has been deleted, at step 962, and ends its operation.

Of course, various changes and modifications to the illustrative embodiment described above will be apparent to those skilled in the art. For example, the basic hub processes characterized above may initiate communications with devices, and once those communications are established, hand them over to a streaming process (an open channel with minimal overhead), to free up hub resources. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A controller for communications-enabled devices comprising:
- an input and output port for communicating with a plurality of different communications-enabled devices that communicatively connect thereto;
- a device registration port for receiving registration information including a device identifier for each of the devices from storage entities that are physically separate from the devices and store registration information of the devices including the devices' identifiers;
- a memory coupled to the device registration port for storing programs and the received device registration information including the device identifiers;
- a processor coupled to the memory and to the ports for executing the stored programs and using the stored information; and
- the stored programs including
  - a first program for causing the controller to communicate with each of the devices, via communications that are encrypted by using the devices's device identifier.

2. The controller of claim 1 wherein:
the stored device registration information for a device includes a program whose execution implements a user interface to the device.

3. The controller of claim 1 wherein:
the first program causes the controller to communicate with the device via communications that are encrypted with an encryption key that comprises the device identifier.

4. The controller of claim 3 wherein:
the stored programs include
a second program for interacting with the device to enable a user to change the device ID.

5. The controller of claim 1 wherein:
the stored programs include
- a second program for causing the controller to interface communications between a plurality of the devices, to enable those devices to communicate with each other.

6. The controller of claim 1 wherein:
the storage entities comprise
- a corresponding storage device for each communications-enabled device, storing registration information of the device; and
- the device registration input port comprises a reader for reading the devices' corresponding storage devices.

7. The controller of claim 1 further comprising:
at least one second input and output port for communicating on an external network that communicatively couples thereto; and
the stored programs further include
- a second program for causing the controller to communicate through the second port on the external network and to communicatively connect at least some of the devices to the external network.

8. The controller of claim 7 wherein:
the stored device registration information for a device includes a third program whose execution implements a user interface to the device; and
the second program enables a user on the external network to invoke execution of the third program.

9. The controller of claim 8 wherein:
the second program further enables the user to interact with the device through the interface implemented by the third program.

10. The controller of claim 7 wherein:
the stored programs include
a third program responsive to receipt of a communication from a device for causing the second program to communicate the communication over the external network to a provider of services associated with the device.

11. The controller of claim 10 wherein:
the registration information for the device includes information identifying data objects by which the service provider is able to communicate with the device.

12. The controller of claim 10 wherein:
the third program further causes the second program to register the controller over the external network with the service provider.

13. The controller of claim 7 wherein:
the external network is an Internet and the second program comprises a Web server program.

14. The controller of claim 7 wherein:
the second program enables a user on the external network to communicate with at least some of the devices.

15. The controller of claim 1 wherein:
the stored programs include
a second program responsive to receipt from the device registration port of the registration information of a device, for causing the first program to communicate at least some of the registration information to the device.

16. The controller of claim 1 wherein:
the input and output port comprises a wireless communications controller.

17. The controller of claim 1 wherein:
the input and output port and the plurality of devices form a local area network.

18. The controller of claim 1 wherein:
the registration information for a device includes information identifying data objects by which the device is able to communicate.

19. The controller of claim 1 wherein:
some data objects are exclusive to the device and other data objects are common to a plurality of devices.

20. The controller of claim 1 wherein:
the stored programs include
a second program responsive to a user request to unregister a device for deleting the stored registration information of the device.

21. The controller of claim 1 wherein:
the stored programs include
a second program for causing the controller to communicate with the devices via a broadcast communication whose receipt enables the devices to receive the communications caused by the first program.

22. The controller of claim 21 wherein:
the broadcast communication is for activating the devices from a standby communications state to an active communications state.

* * * * *